Jan. 31, 1967    M. GOLDBERG    3,301,502
AUTOMATIC THREADING FILM REEL
Filed June 7, 1965
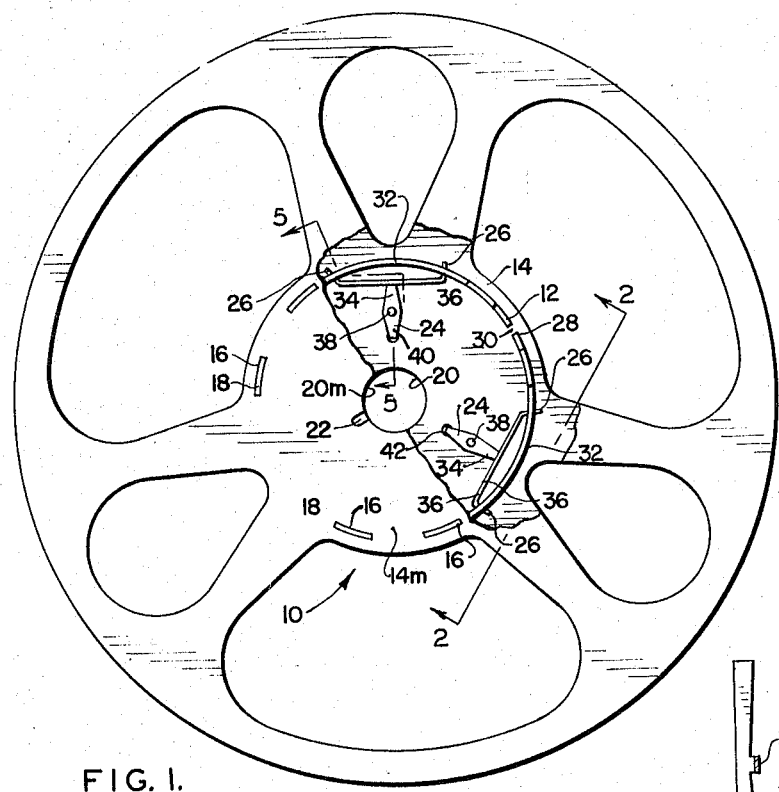
FIG. 1.
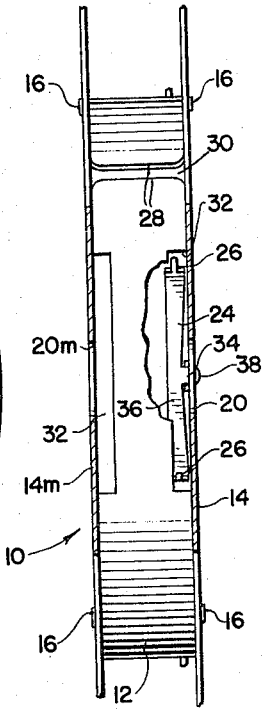
FIG. 2.
FIG. 4.
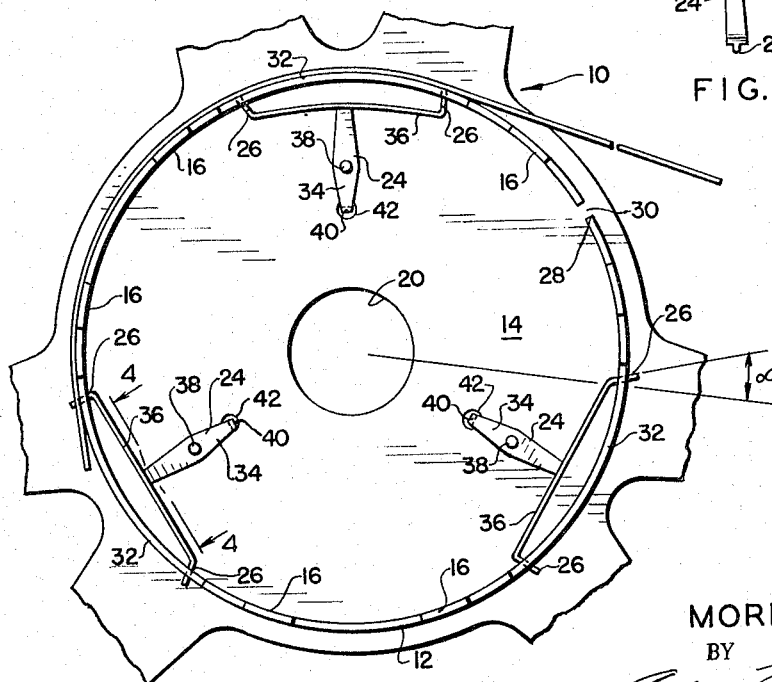
FIG. 3.
FIG. 5.
INVENTOR.
MORRIS GOLDBERG
BY
ATTORNEYS United States Patent Office 3,301,502
Patented Jan. 31, 1967

3,301,502
AUTOMATIC THREADING FILM REEL
Morris Goldberg, Denver, Colo., assignor to Goldberg Brothers, Inc., Denver, Colo., a corporation of Colorado
Filed June 7, 1965, Ser. No. 461,876
10 Claims. (Cl. 242—74)

This invention relates to film storage reels and, more specifically, to reels of the self-threading type for movie film.

For many years now, the only moving picture film reels available were those with the hollow slotted hub into which the end of a leader was threaded and kept in place frictionally by rotating the reel by hand a turn or two until one or more layers of the leader covered the slot. This type of film reel, while still in wide-spread use, is difficult and time-consuming to thread, especially for persons who do so infrequently as is often the case with the home movie maker.

In keeping with the advances in the motion picture camera and projector arts, improvements in the art of self threading film reels became a necessity.

It has now been found in accordance with the teaching of the instant invention that the problems of the prior art self threading reels can, in large measure, be eliminated by mounting within the hub of the reel one or more small generally T-shaped pick-up elements which have fingers projecting onto the surface of the hub through suitably-placed openings in the latter. The position of these fingers is such as to align with the sprocket holes in the film and the two fingers carried by each pick-up are spaced apart a distance selected to allow both to find a sprocket hole.

The fingers form the terminal extremities of a cross-bar fabricated from spring metal which will allow the fingers to retract into the reel hub should they miss a sprocket hole while one of the other pick-ups is making contact. The most noteworthy features are, however, the design of the pick-ups and their attachment to one of the reel flanges for limited rockable movement. The latter features insure a positive pick-up of the film without tearing it upon either engagement or release.

It is, therefore, the principal object of the present invention to provide a novel and improved self-threading film reel for motion picture film projectors.

A second objective is the provision of a device of the character aforementioned that includes a positive pick-up mechanism which rarely, if ever, fails to start the film onto the hub of the take-up reel.

Another object of the device herein disclosed and claimed is the provision of a self-threading take-up reel that will both engage and release the film without tearing out the sprocket holes.

Still another desirable feature of the reel is the ease and simplicity of its operation, the latter requiring no special skill or training on the part of the operator.

An additional objective is to provide a film take-up reel that is so designed that it combines the self-threading and manually threaded constructions in such a manner that one does not interfere with the other.

Further objects of the instant invention are to provide a self-threading movie film reel which is simple, efficient, easy to use, lightweight, inexpensive, rugged, versatile and capable of being used with any standard 8 mm. film and nearly all movie projectors.

Other objects will be in part apparent and in part pointed out specifically hereinafter in connection with the description of the drawings that follows, and in which:

FIGURE 1 is a side elevation of the self-threading film reel of the present invention, portions of one of the flanges having been broken away to expose the hub and pick-up elements;

FIGURE 2 is an enlarged fragmentary section taken along line 2—2 of FIGURE 1, portions of the hub having been broken away to reveal the pick-up;

FIGURE 3 is an enlarged fragmentary detail similar to FIGURE 1 except that the entire flange has been removed exposing the interior of the hub, the pick-up elements and the way they engage the sprocket holes in the film;

FIGURE 4 is a fragmentary section taken along line 4—4 of FIGURE 3 showing the T-shaped pick-up by itself; and, FIGURE 5 is a further enlarged fragmentary section taken along line 5—5 of FIGURE 1.

Referring now to the drawings for a detailed description of the present invention and, initially, to FIGURE 1 for this purpose, it will be seen that the reel has been broadly designated by reference numeral 10 and it includes a hollow cylindrical hub 12 bordered and enclosed on both sides by a pair of coil-retaining flanges 14 and 14m which differ slightly from one another in a way which will be described presently. The side margins of the hub 12 are provided with a plurality of bendable ears 16 that fit into suitably-located slots 18 in the flanges and then are crimped to fasten these elements together in assembled relation.

Both flanges 14 and 14m are essentially identical except for the central openings 20 and 20m therein that receive the drive spindle (not shown) of the projector and the provisions made in flange 14 for mounting the pick-ups which will be described presently. Opening 20 in flange 14 is circular and designed to lie adjacent the free end of the spindle; whereas, opening 20m in flange 14m includes one or more radial slots or keyways 22 that accept the key or spline on the spindle and form a driving connection therebetween. The plain circular opening 20 will not, of course, pass the spline on the spindle therefore, the reel can only fit on the latter one way. In addition, this spindle always drives the reel in the same direction when the latter is taking on film.

In addition, 8 mm. motion picture film has sprocket holes only on one side due to the fact that 8 mm. film is actually 16 mm. film split longitudinally down the middle. When properly threaded through the projector, the sprocket holes will always be on the same side of the film take-up reel and this, coupled with the fact that the direction of reel rotation and reel orientation on the drive spindle remain uniform, enables the pick-up elements 24 to be properly located and designated. It is especially important that the direction of reel rotation when picking up the film is always the same because the sprocket-hole-engaging fingers 26 on the pick-ups are preferably inclined in the direction of reel rotation to insure fool-proof operation as will be explained presently.

FIGURES 1, 2 and 3 all reveal the construction of the reel hub 12 which will be seen, in the particular form illustrated, to be of the "split-ring" type with the free ends 28 thereof left in slightly spaced relation to provide a film-receiving slot 30 therebetween. By so constructing the hub, the reel can be used in the conventional manner and manually threaded if, perchance, the pick-ups become bent or otherwise damaged. The more likely occurrence is, however, that an operator unfamiliar with the fact that the reel is the self-threading type will attempt to use the projector and require the standard slotted hub in order to thread the film.

The hub may, of course, have the ends 28 butted together or designed to eliminate the split altogether without detracting from the self-threading aspects of the reel.

The hub design illustrated is, of course, the preferred one for the reasons above-noted.

The sides of the hub lying adjacent the flanges are provided with one or more elongate notches 32 which cooperate with said flanges to produce slots that pass the fingers 26 of the pick-ups onto the outer surface as shown in FIGURES 1, 2, 3 and 5 to which reference will now be made. As illustrated, identical sets of notches are provided on both edges of the hub even though only one set is actually used. This eliminates the need for orienting the hub relative to the different flanges and makes assembly somewhat easier although, obviously, one set of notches could be eliminated altogether. Three such notches 32 have been shown spaced angularly 120° apart to accommodate three pick-up elements 24. A lesser or greater number of notches and pick-ups may be used although three have proven adequate to fasten the film to the reel with very nearly 100% results and more could hardly do better.

Next, with reference to all of the figures of the drawing, the pick-up elements 24 and the manner in which they are fastened to flange 14 for limited rockable movement will now be set forth. As illustrated, the pick-ups 24 are each generally T-shaped to define a stem portion 34 topped by a cross-bar portion 36 that terminates at its opposite extremities in the fingers 26. The stem portions 34 extend radially outwardly from the axis of rotation of the reel and are loosely fastened by rivet 38 to reel flange 14 for rockable movement across the face of the latter about a pivot axis located intermediate the ends of said stem. The extent of pivoted movement of the pick-up elements is limited by providing the stem portions with a laterally-extending ear 40 on their inner extremities that passes into an oversized opening 42 in the reel flange 14. Thus, the pick-ups can rock back and forth on the flange 14 a few degrees both directions until the ears 40 contact the edges of the openings 42 into which they pass. The reason for this is to provide a yieldable pick-up which will move slightly and absorb some of the initial shock that tends to tear out the sprocket holes (not shown) in the film when the fingers 26 first enter same as shown in FIGURE 3. In addition, the tension applied to the film as it is wound onto the reel rocks the pick-up clockwise as viewed in FIGURE 3 bringing the fingers 26 into nearly a radial position that facilitates release of the film as it is unwound back off the take-up reel.

Initially, each of the fingers 26 is tilted toward the direction the take-up reel rotates when taking on film, this direction being counter-clockwise as viewed in FIGURES 1 and 3. It has been found that the angle of tilt ($\alpha$) of the fingers relative to a radial line passing through the point at which the fingers join the main cross bar portion 36 of the pick-up is preferably approximately 15° although it may vary a few degrees either way from this optimum value and still function satisfactorily. The reason for this tilt in the fingers is to render the pick-up nearly 100% effective in engaging the film. The closer the fingers come to assuming a radial position, the more easily the film becomes disengaged therefrom. On the other hand, if the pick-ups are bent over too far, they miss entering the sprocket holes altogether. The finger tilt angle $\alpha$, therefore, becomes important to foolproof operation.

As previously mentioned, with the film tugging on the pick-up as is the case with the pick-up shown in the lower left of FIGURE 3, the fingers move clockwise slightly due to the rockable connection and they assume a more nearly radial relation to the axis of reel rotation. In addition, the pick-ups are fabricated from spring metal and they bend slightly when the film pulls on them, the net result being that they assume the approximately radial position shown in the lower left corner of FIGURE 3 after having engaged the film.

If, on the other hand, the film catches onto a finger and applies an instantaneous shock load thereto that would ordinarily be sufficient to tear out a sprocket hole, the fingers will bend over past the radial position and immediately release the film before damage can occur. To insure the fact that the fingers will yield and release the film under conditions of abnormal load, the pick-up is designed such that the entire cross-bar portion of the pick-up can bend and assume a bowed configuration. Such design is achieved by forming the entire pick-up by stamping same from a single sheet of thin springable metal. The stem portion 34 lies flat against flange 14 but the cross-bar portion 36 is bent outwardly into normal relation to said stem portion at the juncture therebetween so as to form a leaf spring having the fingers 26 formed on its extremities. If, as is the case in FIGURE 3, the fingers 26 on the uppermost pick-up should miss a sprocket hole, the cross-bar portion 36 will merely bow inwardly as shown under the pressure of the film engaging the finger ends and cause them to retract inside the hub to become essentially inoperative. The spacing between the fingers is selected such that both will usually enter a sprocket hole. One finger is, however, enough to pick-up the film and the double-fingered pick-ups and use of more than one such pick-up merely increases the chances of one engaging the film.

Finally, with particular reference to FIGURE 5, it will be seen that the fingers 26 project from atop a base portion 44 that is the full width of the cross-bar portion, the fingers being narrower in order to fit easily into the sprocket holes in the film. This base portion 44 is sufficiently wide such that one edge thereof rests against the flange 14 and keeps the finger 26 aligned transversely with the sprocket holes in the film. The base portion is also wider than the notch 32 in the reel hub thus producing a shoulder 46 alongside the finger that rests against the inside of the hub and limits the distance to which the fingers project beyond the surface of the latter. The cross-bar portion 36 of the pick-up element is sprung slightly to bias the shoulders 46 firmly against the hub. The fingers terminate in tapered ends 48 that project all the way through one layer of film and part way into the second as seen in FIGURE 3. If the second layer fails to produce a sprocket hole aligned with the finger, the film will merely depress the latter or ride up over it, neither of which cause any problem.

Having thus described the several useful and novel features of the self-threading film reel of the present invention, it will be seen that the many worthwhile objectives for which it was developed have been achieved. Although but a single specific embodiment of the invention has been illustrated and described herein, I realize that certain changes and modifications may well occur to those skilled in the art within the broad teaching hereof; hence, it is my intention that the scope of protection afforded hereby shall be limited only insofar as said limitations are specifically set forth in the appended claims.

What is claimed:

1. A self-threading reel for motion picture film of the type having a row of sprocket holes extending along at least one side thereof which comprises: a hollow circular hub of a width corresponding to the width of the film to be wound thereon, said hub having at least one circumferentially-elongate notch adjacent the edge of the film containing the sprocket holes; a pair of disk-shaped flanges fastened to the opposite side edges of the hub to form a continuous radially-extending slot therebetween of a width designed to receive and retain the coils of film wound upon the hub, said flanges including centrally-located transversely-aligned openings sized to receive the drive spindle of a motion picture projector, and said flange fastened to the edge of the hub opposite the notched edge having the central opening therein shaped to cooperate with the projector spindle and form a driving connection therebetween; and, at least one pick-up element mounted on the flange adjacent the notched edge of the hub for releasably engaging an end of the film to start same winding onto the reel, said pick-up element comprising a generally T-shaped spring metal member having a radially-extending stem portion fastened to the flange inside the hub in alignment with one of the circumferential notches and a cross-bar portion mounted intermediate its ends to the outer extremity of said stem portion in normal relation thereto immediately inside said notch, said cross-bar portion including outturned end portions forming sprocket-hole engaging fingers projecting onto the outside of the hub through the notch in position to enter one of the sprocket holes in a length of film laid against said hub.

2. The self-threading film reel as set forth in claim 1 in which: the pick-up element is attached to the flange for limited rockable movement in a plane parallel to the flanges.

3. The self-threading film reel as set forth in claim 2 in which: the pick-up element is attached to the flange by means which comprises a pivot forming fastener attaching the stem portion at a point intermediate its ends to the flange, an ear formed on the inner extremity of the stem portion extending in the direction of the adjacent flange, and an oversized opening in the flange positioned to receive said ear for limited side-to-side motion.

4. The self-threading film reel as set forth in claim 1 in which: the fingers on the extremities of the cross-bar portion of the pick-up element are inclined in the direction the reel rotates when taking on film at an angle of approximately 15° to a radial line passing through the juncture between said fingers and said crossbar portion.

5. The self-threading film reel as set forth in claim 4 in which: the fingers are sized and adapted to yield in a direction to release the film before tearing out the sprocket holes therein upon the application of excessive tangential loads.

6. The self-threading film reel as set forth in claim 1 in which: the pick-up element is fabricated from a flat sheet of spring metal, the stem portion lies flat against the flange and the cross-bar portion has its flat face bent into normal relation to said stem portion to provide a leaf spring bendable under the influence of forces resolvable into primarily radial and tangential components.

7. The self-threading film reel as set forth in claim 6 in which: the cross-bar portion of the pick-up element is wider at the extremities thereof where the fingers emerge than the circumferential notch, a shoulder separates the fingers from the cross-bar portion at the juncture therebetween, said shoulder being positioned to engage the inside of the hub alongside the notch and limit the extent the fingers project therethrough.

8. The self-threading film reel as set forth in claim 7 in which: the cross-bar portion of the pick-up is preloaded to bias the stop-forming shoulders tightly against the hub.

9. The self-threading film reel as set forth in claim 1 in which: the pick-up element includes stop-forming means located adjacent the juncture between the cross-bar portion and each finger, said stop-forming means being positioned to engage the inside of the reel hub alongside the circumferential notch and cooperate therewith to limit the extent to which said fingers project beyond the hub.

10. The self-threading film reel as set forth in claim 1 in which: the hub is provided with three circumferentially-elongate notches located in equiangularly-spaced relation to one another, and a pick-up element is provided for each of the three notches.

References Cited by the Examiner

UNITED STATES PATENTS

| | | | |
|---|---|---|---|
| 1,799,748 | 4/1931 | Hayden | 242—74 |
| 2,191,489 | 2/1940 | McQuiston | 242—74 |

FRANK J. COHEN, *Primary Examiner.*

N. L. MINTZ, *Examiner.*